(12) United States Patent
Suzuki et al.

(10) Patent No.: US 9,791,650 B2
(45) Date of Patent: Oct. 17, 2017

(54) CABLE, ELECTRONIC DEVICE, AND METHOD FOR CONTROLLING ELECTRONIC DEVICE

(71) Applicant: SONY CORPORATION, Tokyo (JP)

(72) Inventors: Kazuyoshi Suzuki, Tokyo (JP); Gen Ichimura, Tokyo (JP); Hideyuki Suzuki, Kanagawa (JP); Kazuaki Toba, Kanagawa (JP); Masanari Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/432,556

(22) PCT Filed: Sep. 25, 2013

(86) PCT No.: PCT/JP2013/075911
§ 371 (c)(1),
(2) Date: Mar. 31, 2015

(87) PCT Pub. No.: WO2014/057807
PCT Pub. Date: Apr. 17, 2014

(65) Prior Publication Data
US 2015/0293322 A1    Oct. 15, 2015

(30) Foreign Application Priority Data

Oct. 10, 2012   (JP) .................................. 2012-224876

(51) Int. Cl.
*G02B 6/44*   (2006.01)
*G02B 6/38*   (2006.01)
(Continued)

(52) U.S. Cl.
CPC ......... *G02B 6/4416* (2013.01); *G02B 6/3817* (2013.01); *G02B 6/3885* (2013.01);
(Continued)

(58) Field of Classification Search
CPC ... G02B 6/4416; G02B 6/3817; G02B 6/3885
See application file for complete search history.

(56) References Cited

U.S. PATENT DOCUMENTS 4,721,358 A * 1/1988 Faber ................... G02B 6/3817
385/56
4,969,924 A    11/1990 Suverison et al.
(Continued)

FOREIGN PATENT DOCUMENTS

CN    85105411 A    1/1987
JP    S60-39514 U    3/1985
(Continued)

OTHER PUBLICATIONS

Office Action received for Chinese Patent Application No. 201380051984.X, mailed on May 11, 2016, 23 Pages of Office Action Including 14 Pages of English Translation.
(Continued)

*Primary Examiner* — Ryan Lepisto
(74) *Attorney, Agent, or Firm* — Chip Law Group

(57) ABSTRACT

There is provided a cable including at least one optical fiber cable, at least two electrical cables provided so as to sandwich the optical fiber cable, and plugs positioned at both ends and each having an electrical contact part connected to each of the electrical cables.

4 Claims, 13 Drawing Sheets

(51) Int. Cl.
  *H01R 103/00* (2006.01)
  *H01R 13/631* (2006.01)
  *G02B 6/42* (2006.01)
  *H01R 13/703* (2006.01)
(52) U.S. Cl.
  CPC .......... *G02B 6/4293* (2013.01); *H01R 13/631* (2013.01); *H01R 13/703* (2013.01); *H01R 2103/00* (2013.01)

(56) References Cited

U.S. PATENT DOCUMENTS

| | | | | |
|---|---|---|---|---|
| 5,109,452 | A * | 4/1992 | Selvin | G02B 6/3817 385/56 |
| 5,259,050 | A * | 11/1993 | Yamakawa | G02B 6/3885 385/114 |
| 7,272,282 | B1 * | 9/2007 | Seddon | G02B 6/4475 385/100 |
| 2010/0290748 | A1 | 11/2010 | Kojima et al. | |
| 2011/0091162 | A1 | 4/2011 | He et al. | |
| 2011/0229090 | A1 * | 9/2011 | Isenhour | G02B 6/3821 385/78 |
| 2011/0280527 | A1 | 11/2011 | Tamura | |

FOREIGN PATENT DOCUMENTS

| | | |
|---|---|---|
| JP | S64-038910 A | 2/1989 |
| JP | 63-044585 U | 10/1989 |
| JP | H07-037441 A | 2/1995 |
| JP | 2000-068938 A | 3/2000 |
| JP | 2000-214354 A | 8/2000 |
| JP | 2006-157811 A | 6/2006 |
| JP | 2006-310197 A | 11/2006 |
| JP | 2007-149499 A | 6/2007 |
| JP | 2009-048818 A | 3/2009 |
| JP | 2009-210906 A | 9/2009 |
| JP | 2010-237640 A | 10/2010 |
| JP | 2010-272417 A | 12/2010 |
| JP | 2012-054057 A | 3/2012 |
| WO | 2011/116162 A1 | 9/2011 |
| WO | 2011/116167 A | 9/2011 |
| WO | 2011-116167 A1 | 9/2011 |

OTHER PUBLICATIONS

European Search Report received for European Patent Application No. 13844807.1, mailed on Apr. 5, 2016, 9 pages.
Office Action for CN Patent Application No. 201380051984.X, issued on Dec. 8, 2016, 9 pages of Office Action and 14 pages of English Translation.
Extended European Search Report for EP Patent Application No. 13844807.1, issued on Aug. 5, 2016, 11 pages.
Office Action for JP Patent Application No. 2014-540797, dated Jul. 18, 2017, 06 pages of Office Action and 05 pages of English Translation.

* cited by examiner

CABLE, ELECTRONIC DEVICE, AND METHOD FOR CONTROLLING ELECTRONIC DEVICE

TECHNICAL FIELD

The present disclosure relates to a cable, an electronic device and a method for controlling the electronic device.

BACKGROUND ART

Recently, an advancement of technology of high pixelization of a display device is in progress, and trends of the advancement of the technology of high pixelization of a display device are expected to continue further. Therefore, a demand for a transmission speed of non-compressed signals to the display device is increasing in proportion to an increase in the number of pixels of the display device.

In a television, for example, a replacement from a standard image quality (SD image quality) of such as 720 horizontal pixels by 480 vertical pixels to a high definition image quality (HD image quality) of such as 1920 horizontal pixels by 1080 vertical pixels is in progress. However, research and development of an image resolution of around 4,000 horizontal pixels by around 2,000 vertical pixels, which is so-called as 4K2K, and, furthermore, also a ultra-high definition television (UHDTV) that is also called a super-high vision of 7,680 horizontal pixels by 4,320 vertical pixels are in progress.

In the 4K2K, a transmission speed of 4 times a transmission speed of the HD image quality is necessary and, in the UHDTV, the transmission speed of 48 times the transmission speed of the HD image quality is necessary. In the transmission speeds like this, there is a problem that transmission of non-compressed video signals due to a past copper wire line is not realistic. Therefore, it is considered that transmission by an optical fiber cable becomes general in the same manner as in the other high-speed data communication such as 100 G bit ETHERNET standard.

CITATION LIST

Patent Literature

Patent Literature 1: JP 2010-237640A

SUMMARY OF INVENTION

Technical Problem

On the other hand, there does not exist a typical standard of a high-speed optical interface of about 10 Gbps or more, which is mainly used in consumer electronics (CE) devices. Although a composite cable that accommodates an electric wire and an optical fiber has been proposed as in, for example, the Patent Literature 1, it cannot be said that optical interfaces for use in infrastructures or managements including present INTERNET have yielded eye-safety from laser light, realistic low cost and a magnitude corresponding to recent compact devices, which are required for the CE devices. Therefore, in view of the trends of high-pixelization of the display devices, an optical interface that is safe, inexpensive and compact, and is mainly used in the CE devices is in demand.

Therefore, the present disclosure intends to provide a novel and improved photoelectric composite cable that is capable of yielding an optical interface that is safe, inexpensive, and compact; and is capable of high-speed transmission, an electronic device and a method for controlling the electronic device.

Solution to Problem

According to the present disclosure, there is provided a cable including at least one optical fiber cable, at least two electrical cables provided so as to sandwich the optical fiber cable, and plugs positioned at both ends and each having an electrical contact part connected to each of the electrical cables.

According to the present disclosure, there is provided an electronic device including a receptacle having at least two electrical contacts and at least one light-emitting part configured to emit laser light for performing communication by light to a partner side electronic device, and a light emission control part configured to control emission of laser light from the light-emitting part. The light emission control part starts control of emission of laser light from the light-emitting part by a current when a cable is connected to the receptacle and the current flows to the electrical contacts from the partner side electronic device.

According to the present disclosure, there is provided an electronic device including a receptacle having at least two electrical contacts and at least one light-receiving part configured to receive laser light for performing communication by light emitted from a partner side electronic device, and a supply control part configured to control supply of a current to the partner side electronic device through the electrical contacts. The supply control part starts supply of a current through the electrical contacts when a cable is connected to the receptacle.

According to the present disclosure, there is provided a method for controlling an electronic device, the method including a step of starting control of emission of laser light from a light-emitting part by a current when a cable is connected to a receptacle having at least two electrical contacts and at least one light-emitting part configured to emit laser light for performing communication by light to a partner side electronic device, and the current flows from the partner side electronic device to the electrical contacts.

According to the present disclosure, there is provided a method for controlling an electronic device, the method including a step of starting supply of a current to a partner side electronic device through electrical contacts when a cable is connected to a receptacle having at least two electrical contacts and at least one light-receiving part configured to receive laser light for performing communication by light emitted from the partner side electronic device.

Advantageous Effects of Invention

As described above, according to the present disclosure, the present disclosure is capable of providing a novel and improved cable that is capable of yielding an optical interface that is safe, inexpensive, and compact, and is capable of high-speed transmission, an electronic device and a method for controlling the electronic device.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.
<1. Embodiment of the Present Disclosure>
[Exemplary System Configuration]
[Exemplary Structure of Cable]
[Exemplary Functional Configuration of Source Device]
[Exemplary Functional Configuration of Sink Device]
[Power Supply through Cable]
[Exemplary Operations of Source Device and Sink Device]
[Exemplary Shape of Cable]
<2. Conclusion>

1. EMBODIMENT OF THE PRESENT DISCLOSURE

[Exemplary System Configuration]

Figure 1:
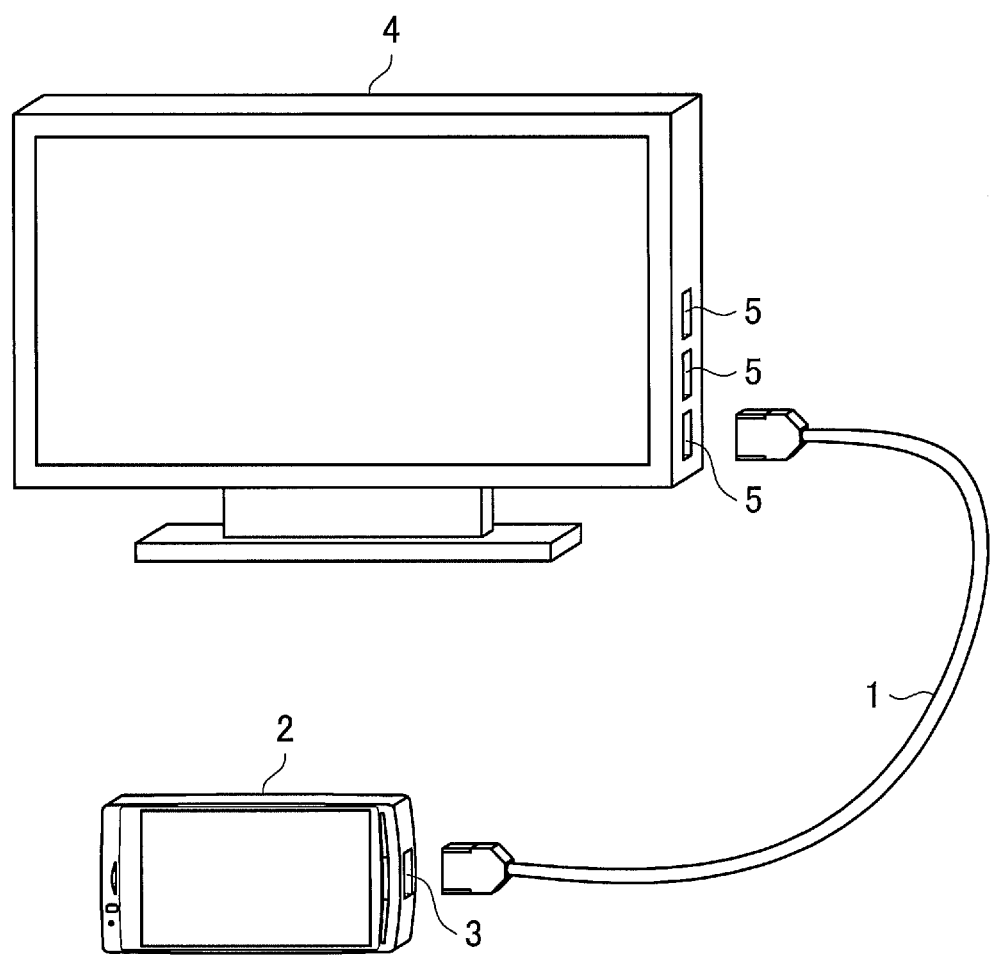
FIG. 1 is an explanatory diagram that shows an exemplary entire configuration of a system configured by electronic devices connected with a cable according to an embodiment of the present disclosure.

Firstly, an exemplary entire configuration of a system according to an embodiment of the present disclosure will be described. FIG. 1 is an explanatory diagram that shows an exemplary entire configuration of a system configured by electronic devices connected with a cable according to an embodiment of the present disclosure. Hereinafter, an exemplary entire configuration of a system according to an embodiment of the present disclosure will be described with reference to FIG. 1.

As shown in FIG. 1, a system according to an embodiment of the present disclosure includes a source device 2 and a sink device 4. The source device 2 and the sink device 4 are connected with a cable 1.

The source device 2 illustrates a compact mobile device such as a smart phone or a digital camera in FIG. 1. The sink device 4 illustrates a television receiver in FIG. 1. The source device 2 is provided with a source device side receptacle 3 for connecting the cable 1, and the sink device 4 is provided with a sink device side receptacle 5 for connecting the cable 1. It goes without saying that the source device 2 and the sink device 4, which are shown in FIG. 1 are only an example, and the source device 2 and the sink device 4 are not limited to those shown in FIG. 1. Further, although a situation where the sink device 4 is provided with a plurality of the sink device side receptacles 5 (three in the drawing) is shown in FIG. 1, it goes without saying that the present disclosure is not limited to such an example.

Here, terms of "source" and "sink" are used under a definition the same as a "source" and a "sink" in a high-definition multimedia interface (HDMI). That is, the source device 2 is a device on a side from which data are sent, and the sink device 4 is a device on a side by which the data are received. Data stored in the source device 2 are transmitted to the sink device 4 through the cable 1 when the source device 2 and the sink device 4 are connected with the cable 1. In the following explanation, a side that sends data is defined as a "source" and a side that receives the data is defined as a "sink".

The cable 1 is a cable that connects the source device side receptacle 3 provided to the source device 2 that is an output source of a video and voice, and the sink device side receptacle 5 provided to the sink device 4. The cable 1 performs delivery of such as video data, voice data, other data, control signals, and electrical power between the source device 2 and the sink device 4. The cable 1 is provided with an optical fiber cable for performing high-speed data transmission between the source device 2 and the sink device 4. Further, the cable 1 is provided with also an electrical cable for sending and receiving electrical power between the source device 2 and the sink device 4. A width of the cable 1 and a size of a connector are desirable to be suppressed to a size that can be used in compact electronic devices such as digital cameras and smart phones.

In the above, an exemplary entire configuration of a system according to an embodiment of the present disclosure has been described with reference to FIG. 1. Next, an exemplary structure of a cable used in a system according to an embodiment of the present disclosure will be described.

[Exemplary Structure of Cable]

Figure 2:
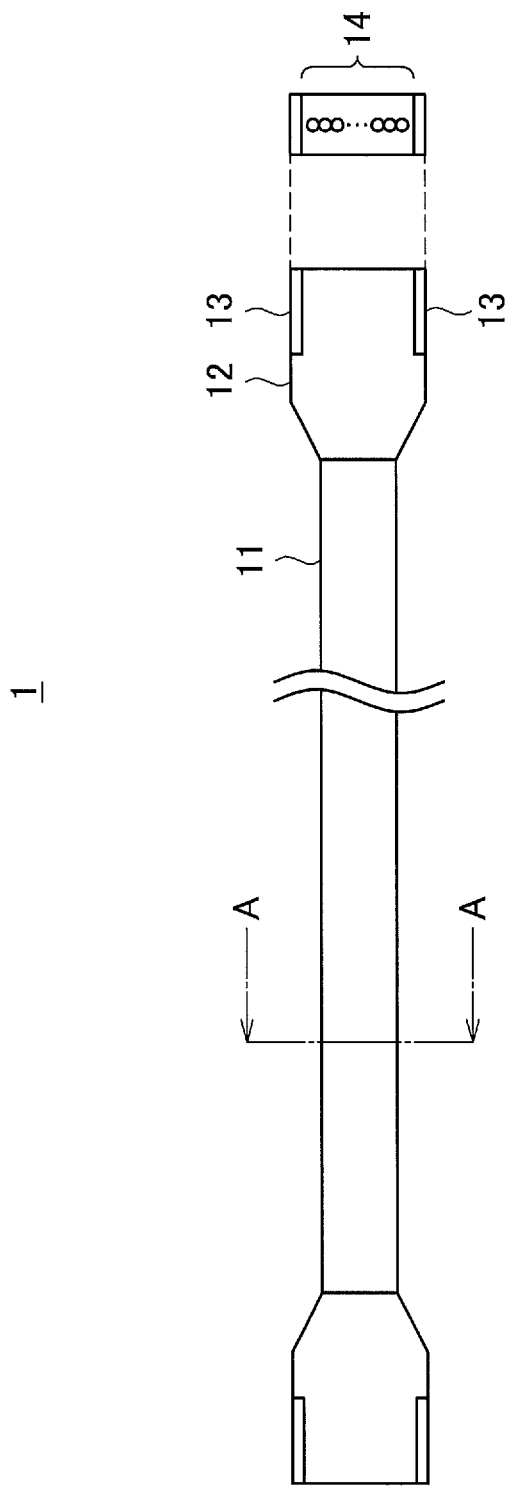
FIG. 2 is an explanatory diagram that shows an exemplary structure of a cable 1 that is used in a system according to an embodiment of the present disclosure.

FIG. 2 is an explanatory diagram that shows an exemplary structure of the cable 1 that is used in a system according to an embodiment of the present disclosure. Hereinafter, an exemplary structure of the cable 1 that is used in a system according to an embodiment of the present disclosure will be described with reference to FIG. 2.

As shown in FIG. 2, the cable 1 includes two plugs 12 provided to both ends, two or more electrical contact parts 13 provided to each of the plugs 12, and a plurality of optical contact parts 14 arranged in a row with a substantial equidistance. Further, a photoelectric composite cable wire 11 described below is formed between the two plugs 12. The photoelectric composite cable wire 11 includes at least one, desirably a plurality of optical fiber cables and two or more electrical cables. The electrical cable is connected to the electrical contact part 13.

The plug 12 is a plug for connecting to the source device side receptacle 3 or the sink device side receptacle 5. Therefore, a shape of the plug 12 is defined to be adaptable to shapes of the source device side receptacle 3 and the sink device side receptacle 5. Further, the electrical contact parts 13 provided to the plug 12 are provided for sending and receiving electrical power between the source device 2 and the sink device 4 as will be described below. It goes without saying that the shape of the plug 12 and a position of the electrical contact part 13 provided to the plug 12 are not limited to those shown in FIG. 2.

When a high-speed and large capacity digital signal of 10 Gbps per one channel is assumed to be flowed to the photoelectric composite cable wire 11 shown in FIG. 2, by using an optical fiber having a plurality of channels (the number of channels) as the photoelectric composite cable wire 11, signals corresponding to multiple number of the channel number can be transmitted. That is, ultra-high-speed communication from several tens of Gbps to exceeding 100 Gbps, which has been very difficult to yield with a past inter-device interface due to only electricity becomes possible.

In the above, an exemplary structure of the cable 1 used in a system according to an embodiment of the present disclosure has been described with reference to FIG. 2. Next, an exemplary functional configuration of the source device 2 that configures a system according to an embodiment of the present disclosure will be described.

[Exemplary Functional Configuration of Source Device]

Figure 3:
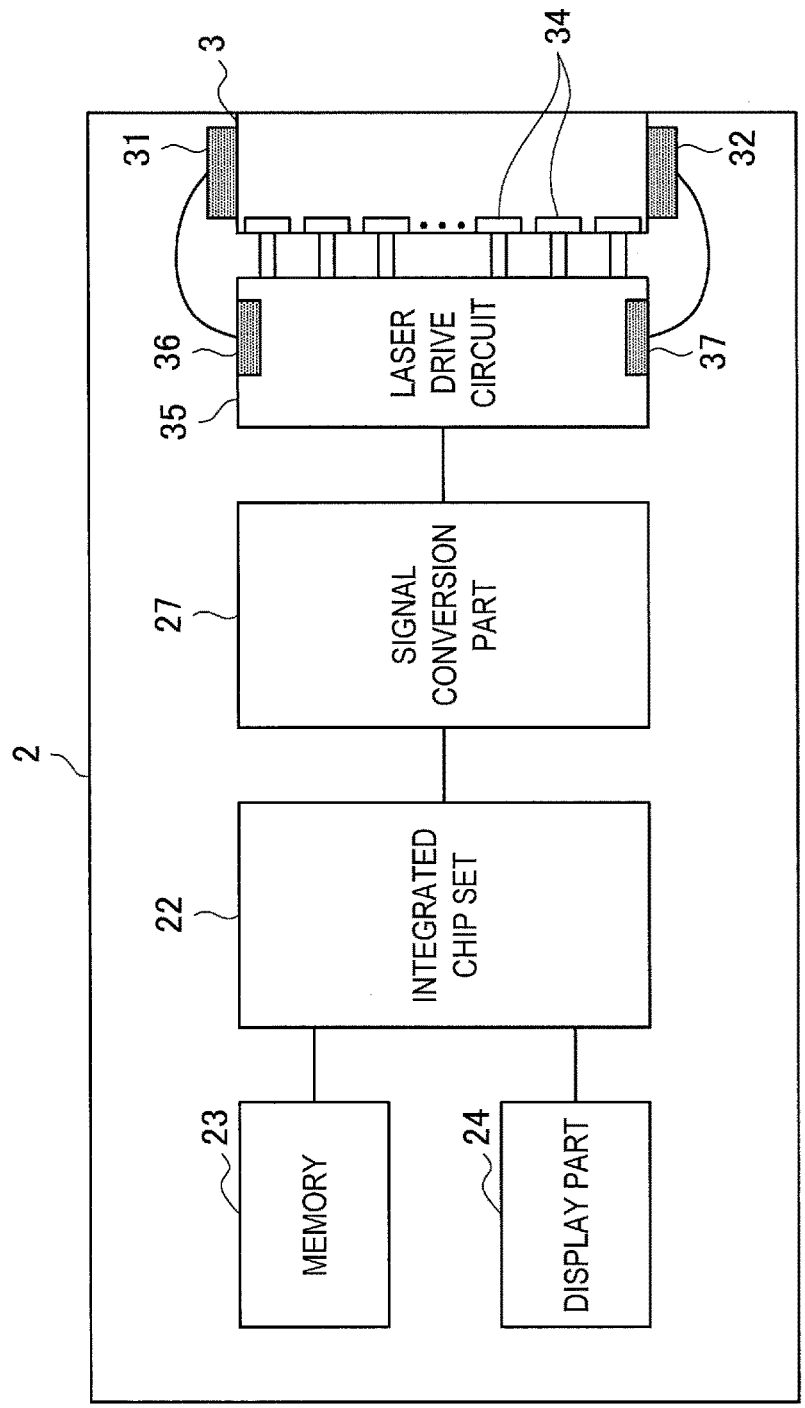
FIG. 3 is an explanatory diagram that shows an exemplary functional configuration of a source device 2 that configures a system according to an embodiment of the present disclosure.

FIG. 3 is an explanatory diagram that shows an exemplary functional configuration of the source device 2 that configures a system according to an embodiment of the present disclosure. Hereinafter, an exemplary functional configuration of the source device 2 will be described with reference to FIG. 3.

As shown in FIG. 3, the source device 2 that configures a system according to an embodiment of the present disclosure includes an integrated chip set 22, a memory 23, a display part 24, a signal conversion part 27 and a laser drive circuit 35. Further, the source device side receptacle 3 provided to the source device 2 includes electrical contacts 31 and 32 and a plurality of light-emitting parts 34.

The integrated chip set 22 performs control of an operation of the source device 2. Although there are various controls of an operation of the source device 2, which the integrated chip set 22 performs, for example, the integrated chip set 22 performs various signal processes for supplying to the sink device 4 over contents such as an image and a voice, which are supplied from the source device 2 to the sink device 4. The memory 23 stores such as various programs that control an operation of the source device 2 and data that are used for control of the operation, and as required, the program or the data are read from the integrated chip set 22. The display part 24 displays images, characters and other pieces of information and includes such as a liquid crystal display and an organic EL display. The display part 24 displays images, characters and other pieces of information by the control of the integrated chip set 22.

The signal conversion part 27 converts data of the contents such as an image and a sound into a signal for driving the laser drive circuit 35. A signal produced by the signal conversion part 27 is supplied to the laser drive circuit 35.

The laser drive circuit 35 makes the light-emitting parts 34 of the source device side receptacle 3 emit light based on the signal supplied from the signal conversion part 27.

The light-emitting part 34 emits laser light by the laser drive circuit 35. The light-emitting part 34 includes such as an optical member such as a vertical cavity surface emitting laser (VCSEL) element for transmitting a signal by light emission and a lens formed associatively with the VCSEL element.

The light-emitting part 34 is provided to a position corresponding to an optical contact of the plug of the cable 1. The electrical contacts 31 and 32 are provided to positions that sandwich the plurality of the light-emitting parts 34 therebetween as shown in FIG. 3. The electrical contact 31 is an electrical contact that imparts a predetermined potential, for example, a potential of +5 V, and the electrical contact 32 is an electrical contact of a potential of GND. When the plug 12 of the cable 1 is engaged with the source device side receptacle 3, the electrical contacts 31 and 32 and the electrical contact parts 13 of the plug 12 come into contact. The source device 2 is capable of receiving a supply of electric power from the sink device 4 by the contact of the electrical contacts 31 and 32 and the electrical contact parts 13 of the plug 12.

The electrical contact 31 that imparts a potential of +5 V is connected with a positive electrode power supply 36 of the laser drive circuit 35, and, in the same manner, the electrical contact 32 of GND is connected to the GND 37 of the laser drive circuit 35, thus, the power supply to the laser drive circuit 35 is made possible.

In the above, an exemplary functional configuration of the source device 2 has been described with reference to FIG. 3. Next, an exemplary functional configuration of the sink device 4 that configures a system according to an embodiment of the present disclosure will be described.

[Exemplary Functional Configuration of Sink Device]

Figure 4:
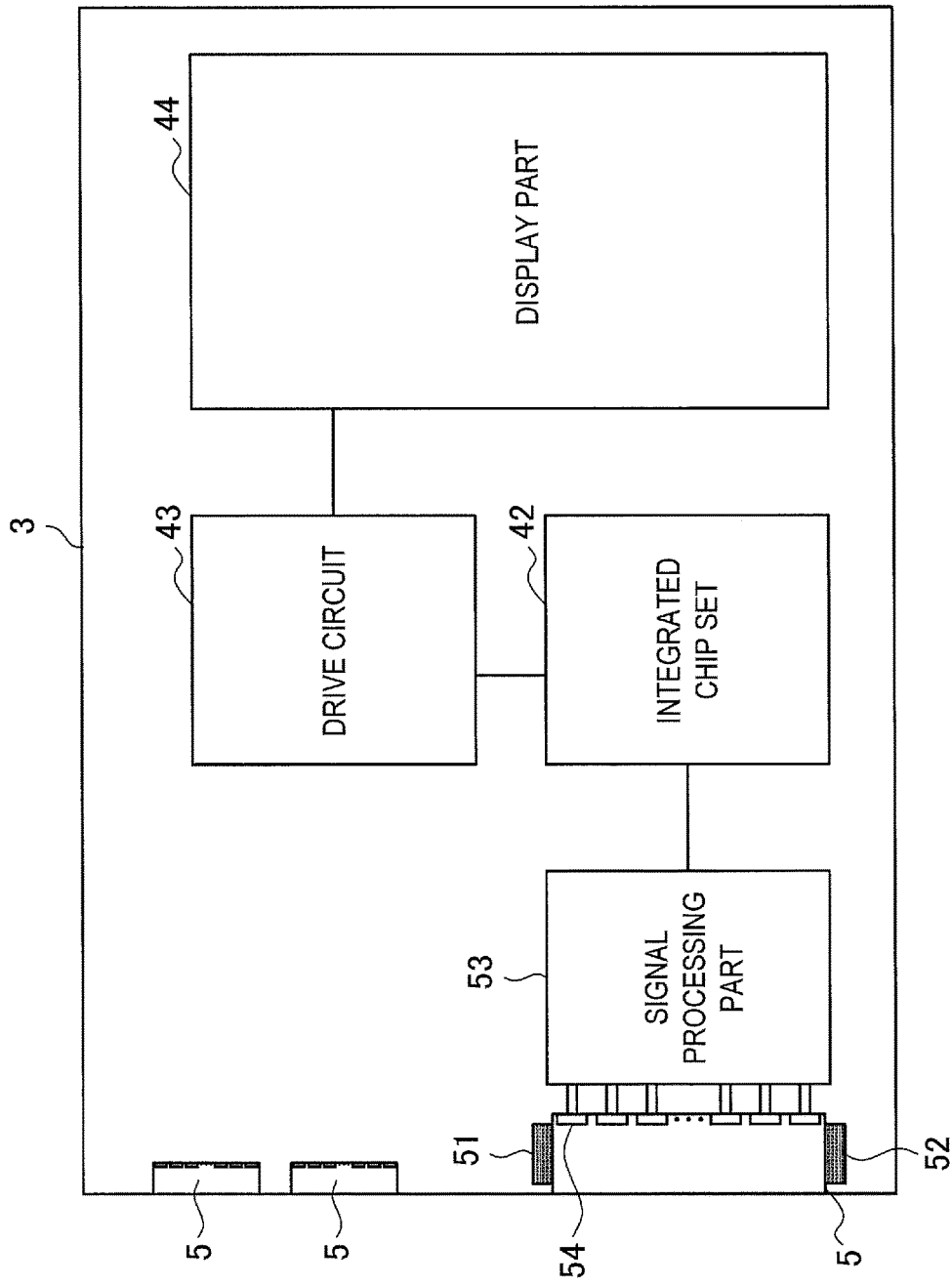
FIG. 4 is an explanatory diagram that shows an exemplary functional configuration of a sink device 4 that configures a system according to an embodiment of the present disclosure.

FIG. 4 is an explanatory diagram that shows an exemplary functional configuration of the sink device 4 that configures a system according to an embodiment of the present disclosure. Hereinafter, an exemplary functional configuration of the sink device 4 will be described with reference to FIG. 4.

As shown in FIG. 4, the sink device 4 includes an integrated chip set 42, a drive circuit 43, a display part 44, and a signal processing part 53. Further, the sink device side receptacle 5 includes electrical contacts 51 and 52, and a plurality of light-receiving parts 54.

The integrated chip set 42 controls an operation of the sink device 4. For example, the integrated chip set 42 performs a signal process for displaying data of contents of an image and a voice transmitted from the source device 2 through the cable 1 on the display part 44, and supplies to the drive circuit 43. The drive circuit 43 acquires the signal from the integrated chip stet 42 and produces a signal for driving the display part 44. The display part 44 includes such as a liquid crystal display or an organic EL display and displays an image when driven by the drive circuit 43.

The sink device 4 includes, as shown in FIG. 4, one or a plurality of the sink device side receptacles 5, and, each of the sink device side receptacles 5 includes a plurality of the light-receiving parts 54 due to a photodiode element for transmitting a signal by receiving light and an optical member such as a lens that is formed associatively with the photodiode element so as to correspond to the optical contact of the plug of the cable 1. The electrical contacts 51 and 52 are provided with the light-receiving parts 54 interposed therebetween. The electrical contact 51 is an electrical contact that imparts a potential of, for example, +5 V, and the electrical contact 52 is an electrical contact that imparts a potential of GND. When the plug 12 of the cable 1 is engaged with the sink device side receptacle 5, the electrical contacts 51 and 52 and the electrical contact parts 13 of the plug 12 come into contact. The sink device 4 is capable of supplying electric power to the source device 2 by the contact of the electrical contacts 51 and 52 and the electrical contact parts 13 of the plug 12.

The contents of such as an image and a voice that are transmitted through the cable 1 and supplied by the source device 2 are guided as an optical signal by an optical fiber core wire 17 of each channel of the cable 1 described below. The optical signal guided by the optical fiber core wire 17 is optically coupled respectively with the light-receiving part 54 of each channel corresponding to the optical contact part 14 of each channel described below.

The signal from the light-receiving part 54 undergoes a signal process at the integrated chip set 42 after processes such as amplification and parallelization have been performed at, for example, the signal processing part 53. The integrated chip set 42 supplies the signal after signal process to the drive circuit 43, and the drive circuit 43 converts into a signal appropriate for driving the display part 44. Then, the content of the image transmitted from the source device 2 is displayed on the display part 44, and the voice transmitted from the source device 2 is sounded by a not shown speaker.

In the above, an exemplary functional configuration of the sink device 4 has been described with reference to FIG. 4. Next, light emission and power supply of the source device 2 due to power supply through the cable 1 that connects the source device 2 and the sink device 4 will be described.

[Power Supply Through Cable]

Figure 5:
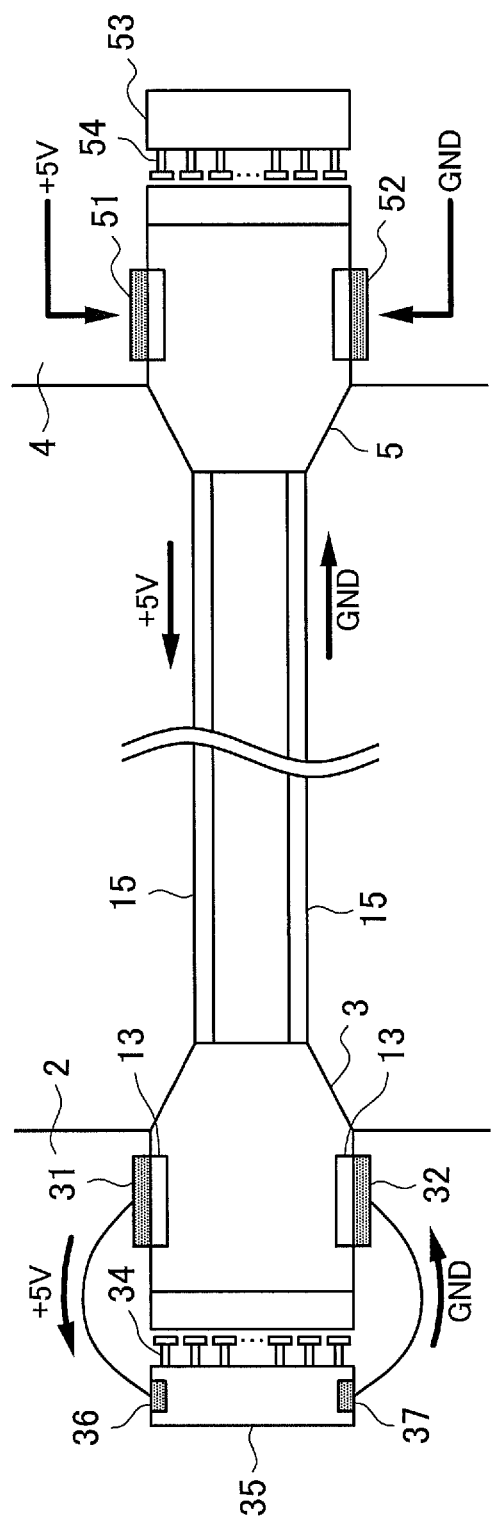
FIG. 5 is an explanatory diagram that shows power supply from the sink device 4 to the source device 2 through the cable 1.

FIG. 5 is an explanatory diagram that shows power supply from the sink device 4 to the source device 2 through the cable 1. Hereinafter, light emission and power supply of the source device 2 due to the power supply through the cable 1 will be described with reference to FIG. 5.

As shown in FIG. 2, the cable 1 is provided with two plugs 12 at both ends and each plug 12 is provided with two or more electrical contact parts 13. The cable 1 is provided with two or more electrical cables 15 that connect between the electrical contact parts 13 provided to the plugs 12 at both ends.

The sink device 4 includes, as described above, the electrical contacts 51 and 52 in the sink device side receptacle 5. The electrical contact 51 is an electrical contact that imparts a potential of, for example, +5 V, and the electrical contact 52 is an electrical contact of a potential of GND. When the plug 12 is inserted into the sink device side receptacle 5, the electrical contact parts 13 come into contact with the electrical contacts 51 and 52. Power supply of 5 V through the electrical cable 15 is performed from the sink device side receptacle 5 to a partner side plug 12 of the cable 1 by the contact of electrical contacts 51 and 52 with the electrical contact parts 13.

When the partner side plug 12 is inserted into the source device side receptacle 3, the electrical contact parts 13 come into contact with the electrical contacts 31 and 32. By the contact, a potential of +5 V is imparted to the laser drive circuit 35 on the source device side. In the same manner, also the GND side is connected through the electrical cable 15 of the cable 1. Therefore, by power supply from the sink device 4, the light-emitting part 34 of the source device 2 becomes capable of being driven.

Further, when the source device 2 and the sink device 4 are connected with the cable 1, by use of the electrical cable 15 provided to the cable 1, the power supply to the source device 2, or, when the source device 2 is provided with a battery, also charging to the battery becomes possible.

In the above, the light emission and power supply of the source device 2 due to power supply through the cable 1 have been described with reference to FIG. 5. Next, exemplary operations of the source device 2 and the sink device 4 when the source device 2 and the sink device 4 are connected with the cable 1 will be described.

[Exemplary Operations of Source Device and Sink Device]

Figure 6:
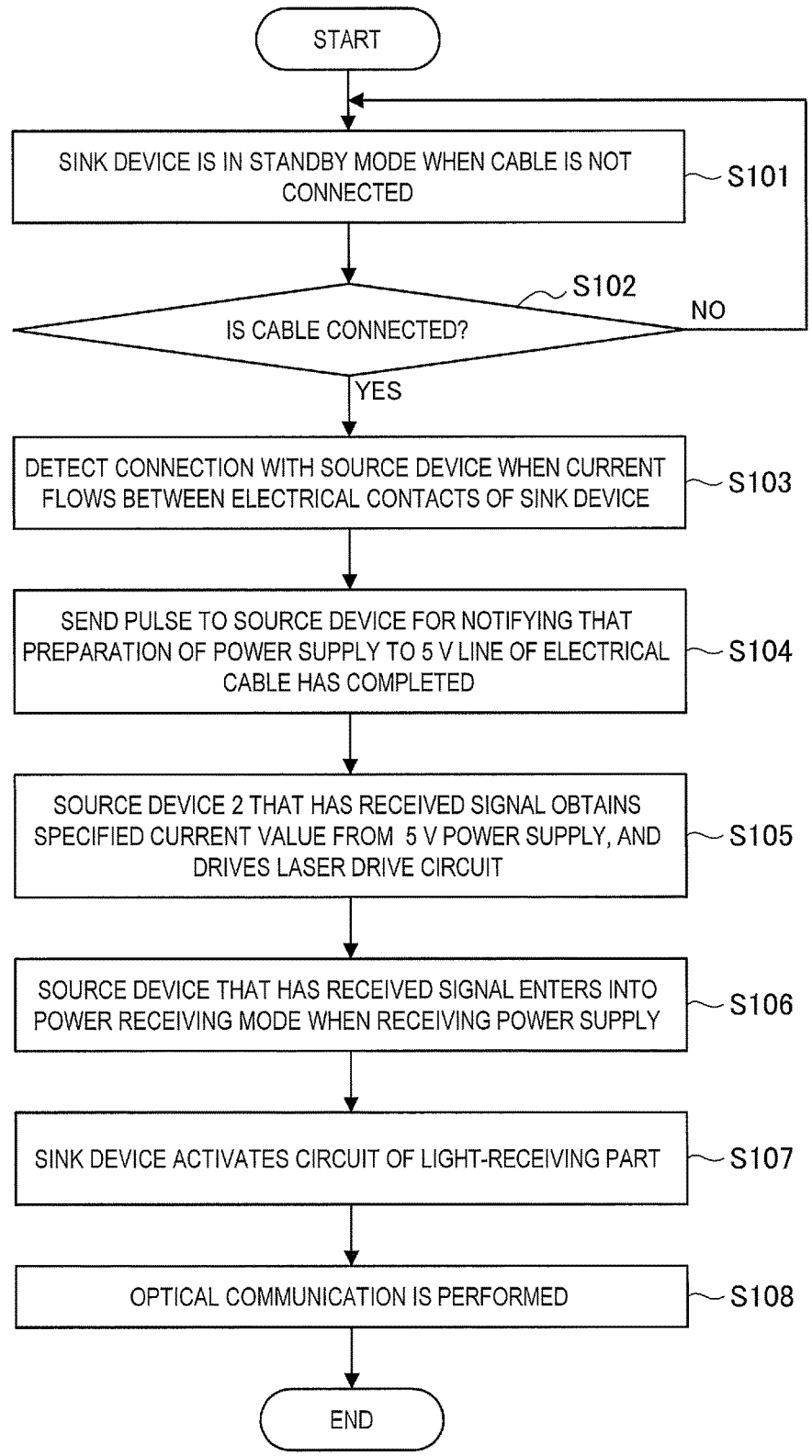
FIG. 6 is a flow chart that shows exemplary operations of the source device 2 and the sink device 4.

FIG. 6 is a flow chart that shows exemplary operations of the source device 2 and the sink device 4 when the source device 2 and the sink device 4 are connected with the cable 1 in a system according to an embodiment of the present disclosure. Hereinafter, with reference to FIG. 6, exemplary operations of the source device 2 and the sink device 4 when the source device 2 and the sink device 4 are connected with the cable 1 will be described.

At the time of non-connection of the cable in which the source device 2 and the sink device 4 are not connected with the cable 1, the sink device 4 is in a standby mode (step S101). In a state in the standby mode, the electrical contact 51 on a +5 V side of the sink device 4 is normally in a small current mode.

The source device 2 and the sink device 4 stand by until the source device 2 and the sink device 4 are connected with the cable 1 (step S102). When the source device 2 and the sink device 4 are connected with the cable 1, the sink device 4 detects connection with the source device 2 through the cable 1 by detecting that a current flowed between the electrical contact 51 on the +5 V side and the electrical contact 52 on the GND side (step S103). The electrical contact 51 on the +5 V side of the sink device 4 side enters into a mode capable of supplying a specified current value larger than that during the standby mode by the connection of the source device 2 and the sink device 4 with the cable 1.

Subsequently, the sink device 4 sends a pulse for notifying that a preparation for power supply from the sink device 4 to a line to which +5 V is supplied of the electrical cables 15 has been completed to the source device 2 (step S104).

The source device 2 that has received the pulse for notifying the completion of preparation of the power supply from the sink device 4 obtains a specified current value from the electrical contact 31 on the +5 V power supply side and drives the laser drive circuit 35 (step S105). Further, when the source device 2 receives power supply from the sink device 4, the source device 2 enters into a mode for receiving the power supply from the sink device 4 (step S106).

Further, the sink device 4 that has detected the connection with the source device 2 through the cable 1 controls from, for example, the integrated chip set 42 such that a circuit of the light-receiving part 54 of the sink device side receptacle 5 is activated (step S107).

When the source device 2 and the sink device 4 are driven like this, laser light is emitted from the light-emitting part 34 of the source device side receptacle 3 only when both devices are surely connected with the cable 1.

Further, when the source device 2 and the sink device 4 are driven like this, the connection by the electrical cable 15 becomes open when the cable 1 came off, and a current is not supplied from the sink device 4 to the source device 2. Therefore, oscillation of the laser light from the light emitting part 34 of the source device side receptacle 3 stops.

That is, when the source device 2 and the sink device 4 are not surely connected with the cable 1, a potential of +5 V is not supplied from the sink device 4 to the source device 2, and since the laser light is not emitted from the light-emitting part 34, the eye safety is yielded.

In the above, exemplary operations of the source device 2 and the sink device 4 when the source device 2 and the sink device 4 are connected with the cable 1 have been described with reference to FIG. 6.

Next, modified exemplary operations of the source device 2 and the sink device 4 will be described. The sink device 4 that has detected the connection through the cable 1 may make active, in the first stage when the light-receiving parts 54 of the sink device side receptacle 5 are activated, firstly only predetermined prioritized one channel among the plurality of the light-receiving parts 54 of the sink device 4. Further, in a signal from the light-emitting part 34 of the source device 2, which corresponds to the prioritized one channel among the light-receiving parts 54, a designation signal that designates a channel that is scheduled to be actually used may be added.

Then, when the prioritized one channel among the light-receiving parts 54 of the sink device 4 receives the designation signal that designates channels scheduled to be actually used from the light-emitting part 34, only the light-receiving parts 54 corresponding to channels only of additionally necessary number, which are designated by the designation signal may be activated.

When the source device 2 and the sink device 4 are operated like this, since only the light-receiving parts necessary for transmitting data between the source device 2 and the sink device 4 are energized, and unnecessary light-receiving parts are not energized, power consumption may be suppressed. Further, when the source device 2 and the sink device 4 are configured like this, low consumption power during standby and low consumption power due to partial drive of only a necessary part of channels can be yielded.

Specifically, as a case where only a part of the channels is partially driven, for example, a case where a bit rate of a signal that is transmitted from the source device 2 to the sink device 4 is low is considered. When the bit rate of a signal transmitted from the source device 2 to the sink device 4 is low, there is no need of driving all channels, and, only by driving minimum channels appropriate for the bit rate of the signal, a signal is transmitted from the source device 2 to the sink device 4.

[Exemplary Shape of Cable]

Figure 7:
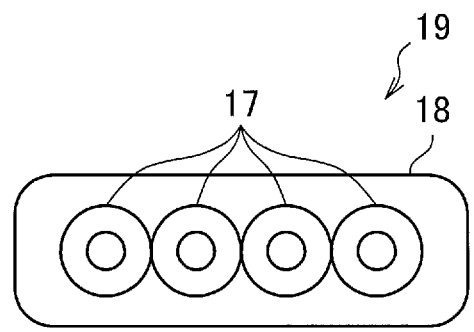
FIG. 7 is an explanatory diagram that shows an exemplary shape of a general optical ribbon.
Figure 8:
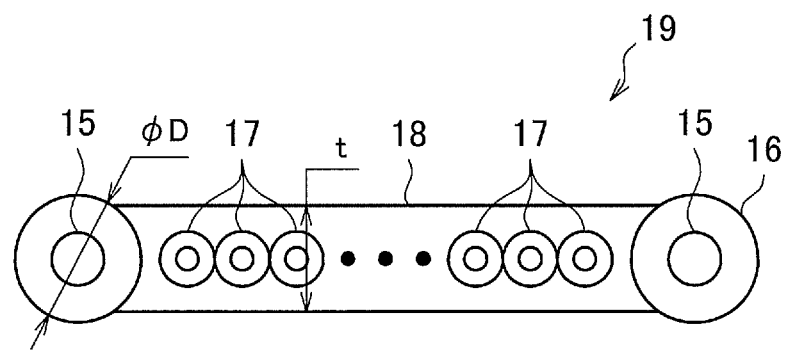
FIG. 8 is an explanatory diagram that shows an exemplary cross-section of the cable 1.

Next, an exemplary shape of the cable 1 used in a system according to an embodiment of the present disclosure will be described. FIG. 7 is an explanatory diagram that shows an exemplary shape of a general optical ribbon, and FIG. 8 is an explanatory diagram that shows an exemplary cross-section of the cable 1.

Firstly, an exemplary shape of a general optical ribbon 19 will be described with reference to FIG. 7. In general, the optical ribbon 19 is configured by arranging a plurality of optical fiber core wires 17 in a row and by covering the plurality of optical fiber core wires 17 with a resinous covering 18 for protecting the optical fiber core wires 17 arranged in a row. As the number of the optical fiber core wires 17, although, for example, 2 cores, 4 cores, 8 cores, and 12 cores are generally considered, the number of the optical fiber core wires 17 is not limited to these.

Next, an exemplary cross section of the cable 1 will be described with reference to FIG. 8. The photoelectric composite cable wire 11 that connects two plugs 12 includes electrical cables 15 with the plurality of the optical fiber core wires 17 interposed therebetween as shown in FIG. 8. Further, when a cross section of the photoelectric composite cable wire 11 is viewed, as shown in FIG. 8, diameters or thicknesses $\Phi D$ of covering parts 16 of the electrical cables 15 that sandwich the optical fiber core wires 17 are thicker than a thickness dimension t of the covering 18 of a part of the optical fiber core wires 17.

When the cable 1 is configured like this, the following advantageous effects are yielded. Firstly, when the photoelectric composite cable wire 11 always comes into contact with a plane such as a floor or a table, the covering part of the electrical cable 15 comes into contact, therefore, an advantageous effect that it becomes difficult to impart an external damage to the optical fiber core wires 17 and the covering 18 of the optical fiber core wires is yielded.

Figure 9:
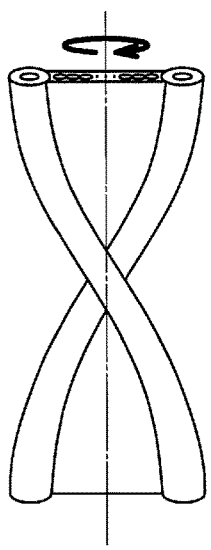
FIG. 9 is an explanatory diagram that shows a case where a photoelectric composite cable wire 11 is twisted.
Figure 10:
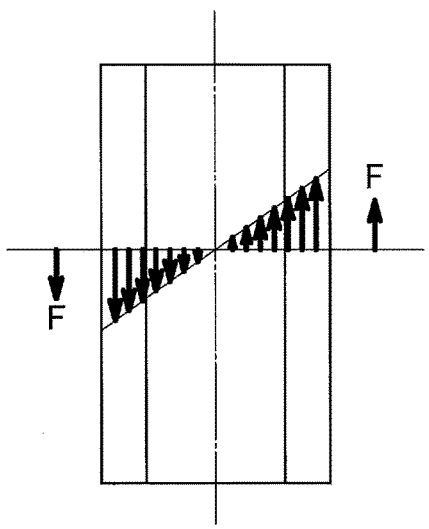
FIG. 10 is an explanatory diagram that shows a case where the photoelectric composite cable wire 11 is laterally bent.
Figure 11:
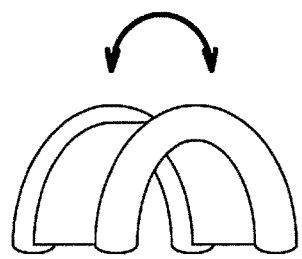
FIG. 11 is an explanatory diagram that shows a case where the photoelectric composite cable wire 11 is vertically bent.

Further, there is an advantageous effect that a role as a mechanical holding member (tension member) when the photoelectric composite cable wire 11 is pulled may be imparted to the electrical cables 15. FIG. 9, FIG. 10 and FIG. 11 each is an explanatory diagram that shows a case where the photoelectric composite cable wire 11 is twisted, laterally bent, or vertically bent. As shown in FIG. 9, FIG. 10 and FIG. 11, together with the role as the mechanical holding member, in all cases where the photoelectric composite cable wire 11 is twisted, laterally or vertically bent, maximum displacement and force F are in proportion to a distance of an axis that is a center of bending. Therefore, since in all cases where the photoelectric composite cable wire 11 is twisted, laterally or vertically bent, the maximum displacement and force F are applied to the electrical cable 15 and the covering part 16 of the electrical cable 15, an advantageous effect that excessive stress is capable of being prevented from occurring to the optical fiber core wires 17 and the covering 18 of the optical fiber core wires 17 is capable of yielding to the cable 1.

Figure 12:
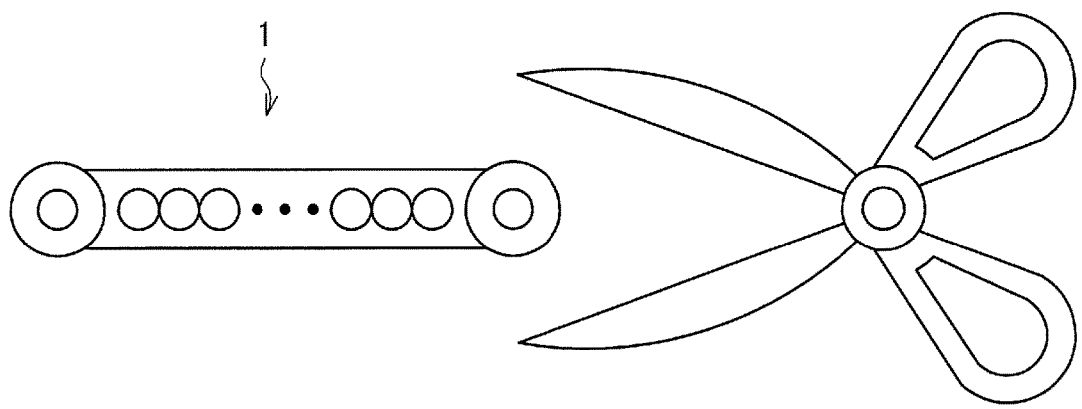
FIG. 12 is an explanatory diagram that shows a situation where the cable 1 is about to be cut with a pair of scissors.

FIG. 12 is an explanatory diagram that shows a situation where the cable 1 is about to be cut with a pair of scissors. As shown in FIG. 12, also when the cable 1 is cut with, for example, a pair of scissors, a cutter, or a sharp corner, a peripheral electrical cable 15 and the covering part 16 of the electrical cable 15 are initially cut. Therefore, the optical fiber core wires 17 and the covering 18 of the optical fiber core wires are cut after the electrical cable 15 and the covering part 16 of the electrical cable 15 are cut.

As described above, when the photoelectric composite cable wire 11 is cut in a state where the source device 2 and the sink device 4 are connected with the cable 1, the electrical cable 15 is cut in advance, therefore, the power supply from the sink device 4 to the source device 2 is stopped and oscillation (light emission) of the laser light of the source device 2 is stopped. That is, in a state where the cable 1 is entirely or partially cut, an infrared ray or visible light that may be detrimental to human eye due to high energy density does not come out of a cut plane of the cable 1. Further, in the same manner, also when the plug 12 is not inserted in the sink device side receptacle 5, the infrared ray or the visible light does not come out from an end plane of the plug 12 or the optical contact part 14. Therefore, even when the photoelectric composite cable wire 11 is cut in a state where the source device 2 and the sink device 4 are connected with the cable 1, the eye safety is yielded.

Figure 13:
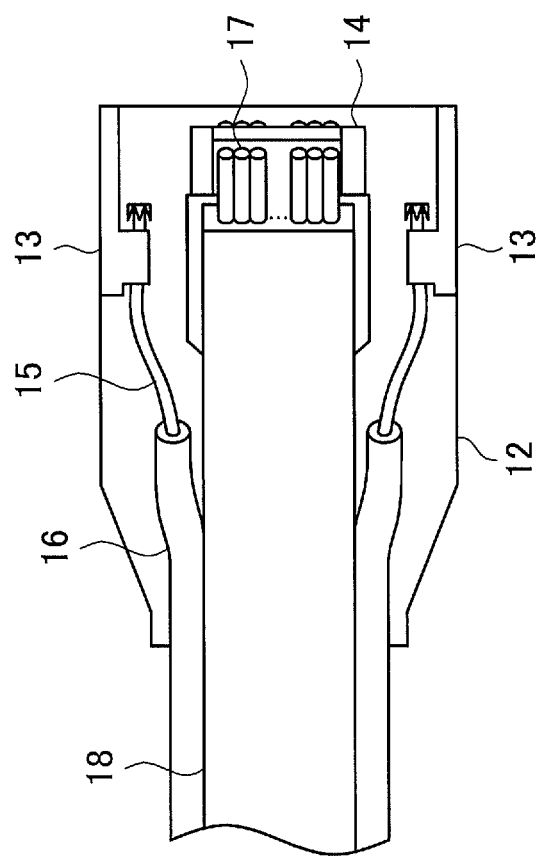
FIG. 13 is an explanatory diagram that conceptually shows a structure of a plug 12 of the cable 1.
Figure 14:
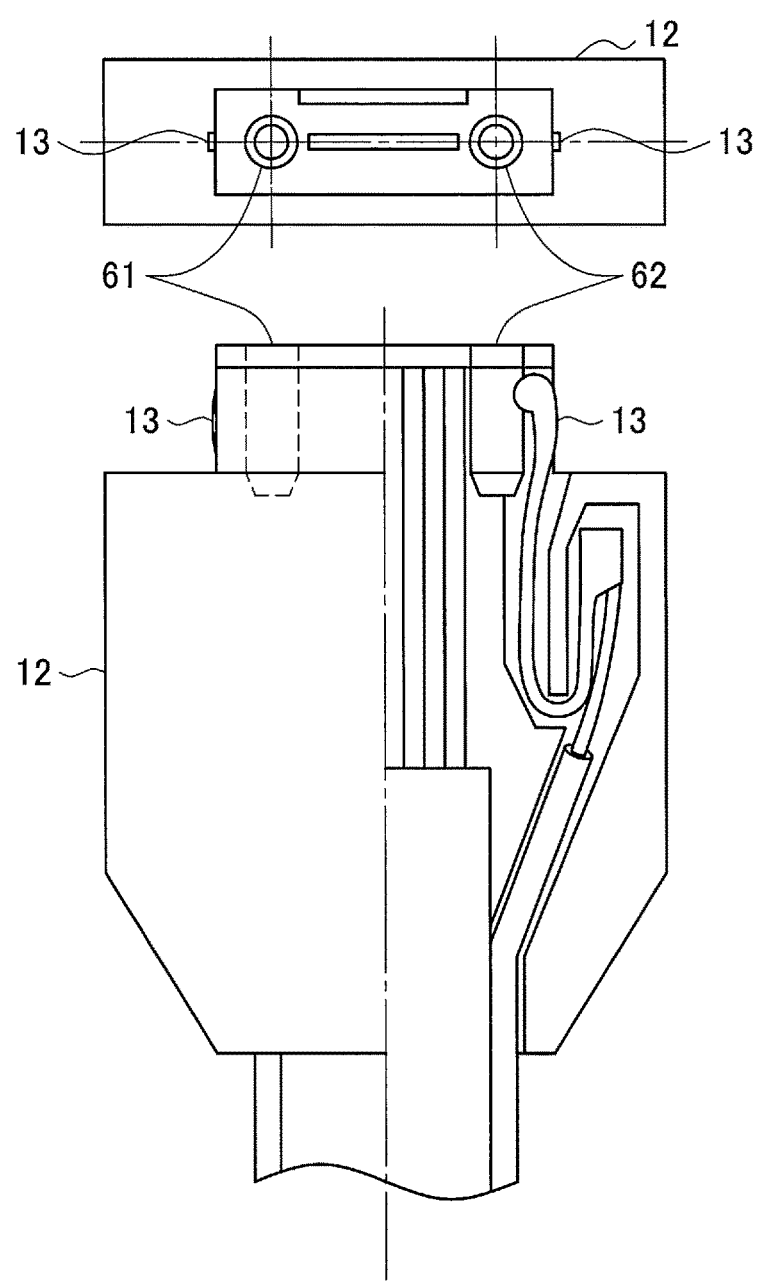
FIG. 14 is an explanatory diagram that shows a plan view and a front view of an exemplary configuration of the plug 12.

Subsequently, an exemplary structure of the plugs 12 provided to both ends of the cable 1 will be described. FIG. 13 is an explanatory diagram that conceptually shows a certain exemplary structure of the plug 12 of the cable 1. Further, FIG. 14 is an explanatory diagram that shows a plan view and a front view of another exemplary structure of the plug 12. As described above, the photoelectric composite cable wire 11 is provided with the electrical cables 15 with the plurality of optical fiber core wires 17 interposed therebetween. Therefore, as a structure of the plug 12, a shape that is shown in, for example, FIG. 13 is considered.

FIG. 13 shows an internal structure of the plug 12. In an example shown in FIG. 13, a plurality of the optical fiber core wires 17 are arranged in a row, and in front of the optical fiber core wires 17, a member of the optical contact parts 14 is provided.

FIG. 14 shows another exemplary structure of the plug 12. In the plug 12 shown in FIG. 14, the plurality of the optical fiber core wires 17 are arranged in a row, and in front thereof, the member of the optical contact parts 14 is formed with positioning hole parts 61 and 62 provided on both sides. FIG. 14 illustrates only a right half of the plug 12 such that an internal structure of the plug 12 may be well understood. As shown in FIG. 14, the electrical contact parts 13 with a spring element are configured so as to come into the positioning hole parts 61 and 62 from a side surface on an opposite side of a side where the optical fiber core wires 17 are present of the positioning hole parts 61 and 62. In examples shown in FIG. 13 and FIG. 14, although the member of the optical contact parts 14 is formed by integrally molding the plurality of channels in a row, a form of the optical contact part in the cable of the present disclosure is not limited to such examples.

Figure 15A:
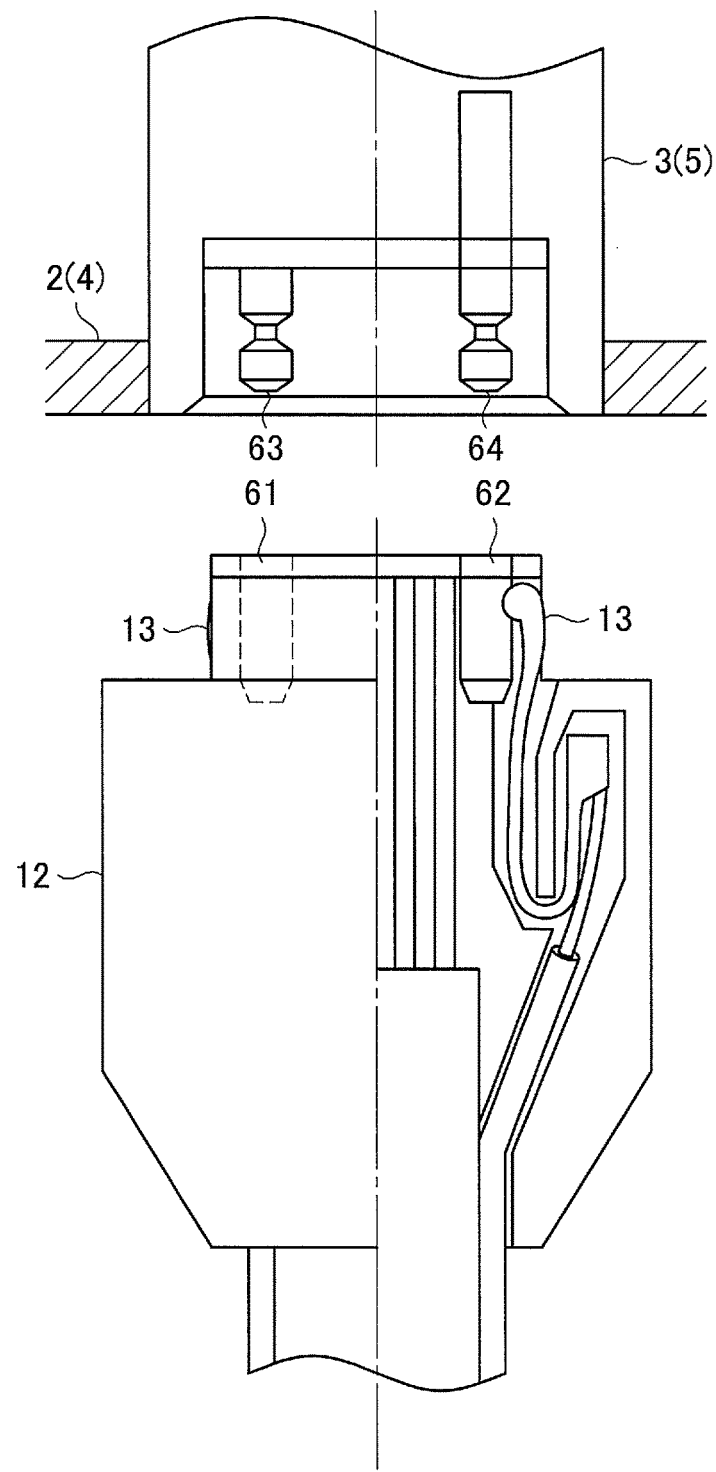
FIG. 15A is an explanatory diagram that shows a situation where a plug and a receptacle are joined.
Figure 15B:
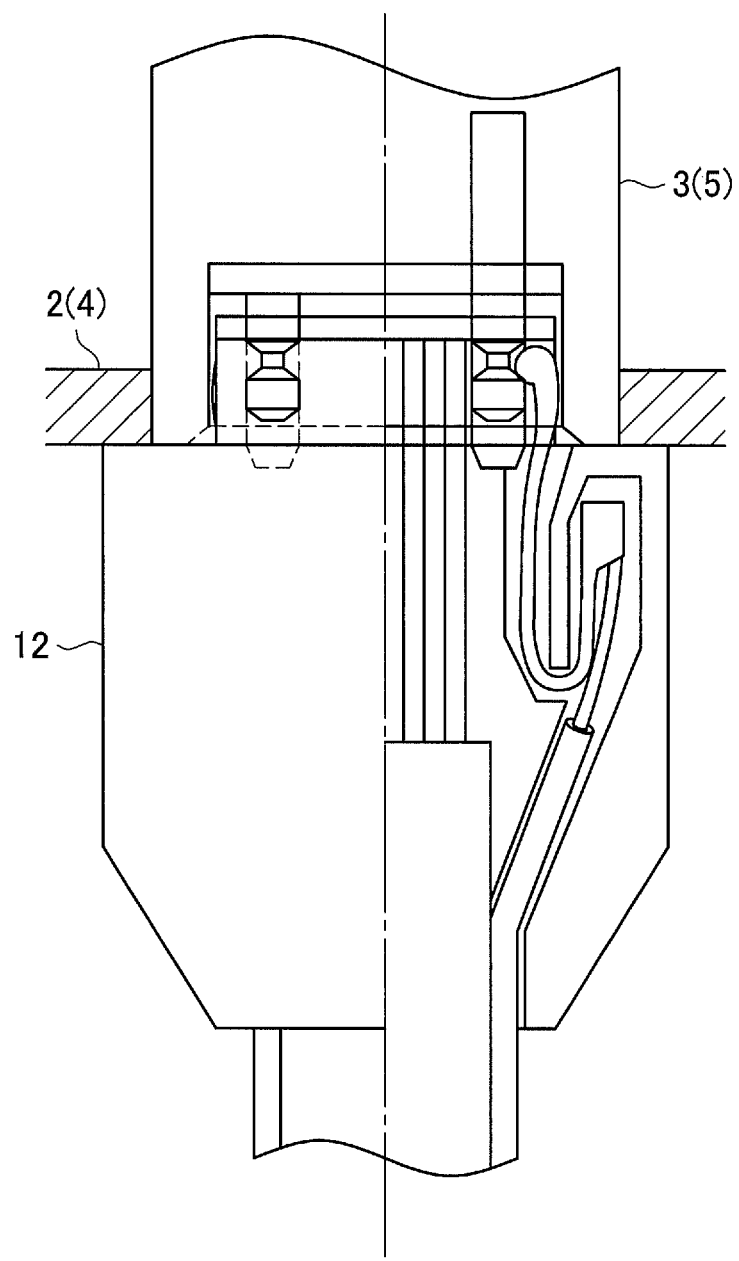
FIG. 15B is an explanatory diagram that shows a situation where a plug and a receptacle are joined.

Next, joining of the plug 12 and the source device side receptacle 3 of the source device 2, or the sink device side receptacle 5 of the sink device 5 will be described. FIG. 15A and FIG. 15B each is an explanatory diagram that shows a situation where the plug 12 and the source device side receptacle 3 of the source device 2, or the sink device side receptacle 5 of the sink device 5 are joined in a plan view. The FIG. 15A and FIG. 15B each shows only a right half of the plug 12 such that an internal structure of the plug 12 may be well understood. FIG. 15A shows a state before the plug 12 and the source device side receptacle 3 of the source device 2, or the sink device side receptacle 5 of the sink device 5 are joined. FIG. 15B shows a state after the plug 12 and the source device side receptacle 3 of the source device 2, or the sink device side receptacle 5 of the sink device 5 have been joined.

Positioning pins 63 and 64 are provided to the source device side receptacle 3 or the sink device side receptacle 5. The positioning pins 63 and 64 are electrical contacts of the source device side receptacle 3 or the sink device side receptacle 5. When the plug 12 is inserted into the source device side receptacle 3 or the sink device side receptacle 5, the positioning pins 63 and 64 are inserted into the positioning hole parts 61 and 62 of the plug 12, and by the contact with the electrical contact parts 13 with a spring element, electrical continuation is established and positioning is performed with respect to an insertion direction.

Further, when the optical contact part 14 of the plug 12 is positioned with respect to the light-emitting part 34 of the source device 2 or the light-receiving part 54 of the sink device 4, an optical communication is performed between the source device 2 and the sink device 4.

The plug 12 configured like this separates, at the time of assembling, two electrical cables 15 (including covering) which are externally disposed in the optical composite cable wire 11, and the optical ribbon 19 into three at the root of the plug 12. Then, the electrical cable 15 is, after the covering has been peeled, electrically joined with the electrical contact part 13 positioned outside of the plurality of optical fiber core wires 17 by means of such as caulking. On the other hand, the plurality of the optical fiber core wires 17 in the center part become a plurality of optical contact parts 14 that are arranged with the same pitch as that (distance between core wires) of the optical fiber core wires. The optical fiber core wires 17 and the integrally molded optical contact parts having such as lenses for condensing light of a plurality of channels arranged with the same pitch may have a configuration in which these are adhered by facing with a distance or by facing without a distance by use of such as an adhesive.

Since the cable 1 is connected to a portable telephone or a digital camera, a size of the plug 12 of the cable 1 is desirable to be formed into a relatively small size, for example, a size identical with a micro-universal serial bus (USB) terminal, or a size smaller than that. Further, the shape of the plug 12 shown in FIG. 14 is an example and the shape of the plug of the cable is not limited to such an example in the present disclosure.

In the above, an exemplary shape of the cable 1 used in a system according to an embodiment of the present disclosure has been described. A form of a cable of the present disclosure is not limited to the form described above.

For example, although a configuration in which two electrical contact parts 13 are provided to the plug 12 is shown in the above description, the present disclosure is not limited to such an example. Three, four or more electrical contact parts 13 may be provided to the plug 12. When three or more electrical contact parts 13 are provided to the plug 12, with a signal, for example, on a +5 V side as a minute differential signal, a signal of an existing electrical interface such as a past mobile high-definition link (MHL) may be flowed through the electrical contact part 13.

Further, for example, as a structure of a positioning pin, the electrical contact part 13 may have a structure in which overall positioning is performed with a polishing shaft. Further, the polishing shaft may be provided with a groove for providing a click feeling at the time of joining or for calling in compression molding.

Further, for example, the optical ribbon 19 is not necessarily arranged in a row. For example, even when the same 12 cores are assumed, the 12 cores may be arranged in a row, or in 3 rows of 4 cores. Further, the plug 12 may be configured also by facing the plurality of the optical fiber core wires 17 and the plurality of the optical contact parts 14 that are arranged with the same pitch as that (distance between core wires) of the plurality of the optical fiber core wires 17.

2. CONCLUSION

As described above, according to an embodiment of the present disclosure, the photoelectric composite interface and the cable 1 used in the photoelectric composite interface may be configured as described above. When the cable 1, the source device side receptacle 3 of the source device 2 and the sink device side receptacle 5 of the sink device 4 are formed into forms as described above, an interface for a not-existing CE device, which is capable of performing communication at a ultra-high-speed from several tens of Gbps to exceeding 100 Gbps, which has been very difficult to yield in an existing interface between devices due to only electricity is yielded.

That is, different from an existing professional optical interface, while having a shape that is suitable for CE devices used in such as homes and is easy to handle, optical fibers incorporated in the cable are suppressed from breaking, the eye safety from a laser light used in communication is yielded, and low consumption power of the source device is yielded. Further, downsizing and thinning of the plug of the cable 1 are yielded, and by reducing an assemblage cost, manufacture at low cost is yielded.

Therefore, the cable 1, the source device 2 and the sink device 4 according to an embodiment of the present disclosure are capable of providing a safe and inexpensive novel photoelectric composite interface corresponding to a rise in a transmission speed of a non-compressed signal accompanying high pixelization of a future display.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)
A cable including:
at least one optical fiber cable;
at least two electrical cables provided so as to sandwich the optical fiber cable; and
plugs positioned at both ends and each having an electrical contact part connected to each of the electrical cables.

(2)
The cable according to (1),
wherein a diameter of a cross-section of a covering part of the electrical cable is longer than a thickness of a covering part of the optical fiber cable.

(3)
The cable according to (1) or (2),
wherein the number of the optical fiber cables is two or more, and a plurality of the optical fiber cables are arranged in a row.

(4)
The cable according to any one of (1) to (3),
wherein the number of the optical fiber cables is two or more, and a plurality of the optical fiber cables are arranged in two or more rows.

(5)
The cable according to any one of (1) to (4),
wherein the plug is provided with a positioning part for joining with a receptacle.

(6)
The cable according to (5),
wherein the electrical contact part is moved to an inside of the positioning part when the plug is joined with the receptacle.

(7)
The cable according to (6),
wherein the electrical contact part includes a spring element.

(8)
An electronic device including:
a receptacle having at least two electrical contacts and at least one light-emitting part configured to emit laser light for performing communication by light to a partner side electronic device; and
a light emission control part configured to control emission of laser light from the light-emitting part,
wherein the light emission control part starts control of emission of laser light from the light-emitting part by a current when a cable is connected to the receptacle and the current flows to the electrical contacts from the partner side electronic device.

(9)
The electronic device according to (8),
wherein the light emission control part makes light emit only from the minimum light-emitting parts necessary for communication with the partner side electronic device at the time when control of emission of laser light from the light-emitting part is started.

(10)
An electronic device including:
a receptacle having at least two electrical contacts and at least one light-receiving part configured to receive laser light for performing communication by light emitted from a partner side electronic device; and
a supply control part configured to control supply of a current to the partner side electronic device through the electrical contacts,
wherein the supply control part starts supply of a current through the electrical contacts when a cable is connected to the receptacle.

(11)
A method for controlling an electronic device, the method including:
a step of starting control of emission of laser light from a light-emitting part by a current when a cable is connected to a receptacle having at least two electrical contacts and at least one light-emitting part configured to emit laser light for performing communication by light to a partner side electronic device, and the current flows from the partner side electronic device to the electrical contacts.

(12)
A method for controlling an electronic device, the method including:
a step of starting supply of a current to a partner side electronic device through electrical contacts when a cable is connected to a receptacle having at least two electrical contacts and at least one light-receiving part configured to receive laser light for performing communication by light emitted from the partner side electronic device.

REFERENCE SIGNS LIST 1 cable
2 source device
3 source device side receptacle
4 sink device
5 sink device side receptacle
11 photoelectric composite cable wire
12 plug
13 electrical contact part
14 optical contact part
15 electrical cable
16 covering part
17 optical fiber core wire
18 covering
19 optical ribbon
22 integrated chip set
23 memory
24 display part
27 signal conversion part
31, 32 electrical contact
34 light-emitting part
35 laser drive circuit
36 positive electrode power supply part
42 integrated chip set
43 drive circuit 44 display part
51, 52 electrical contact
53 signal processing part
54 light-receiving part
61, 62 positioning hole part
63, 64 positioning pin

The invention claimed is:

1. A composite cable, comprising:
   at least a first optical fiber cable;
   at least two electrical cables that sandwiches the at least first optical fiber cable;
   a first plug at a first end of the composite cable; and
   a second plug at a second end of the composite cable,
   wherein each of the first plug and the second plug comprises an electrical contact part connected to each of the at least two electrical cables,
   wherein a diameter of a cross-section of a first covering part of the at least two electrical cables is larger than a thickness of a second covering part of the at least first optical fiber cable,
   wherein at least one of the first plug or the second plug comprises a positioning part, wherein the positioning part is configured to join with a receptacle, and
   wherein the electrical contact part is configured to move to an inside of the positioning part based on at least one of the first plug or the second plug that is joined with the receptacle.

2. The composite cable according to claim 1, further comprising:
   at least a second optical fiber cable, wherein the at least first optical fiber cable and the at least second optical fiber cable are arranged in a row.

3. The composite cable according to claim 1, further comprising:
   at least a third optical fiber cable, wherein the at least first optical fiber cable and the at least third optical fiber cable are arranged in at least two rows.

4. The composite cable according to claim 1,
   wherein the electrical contact part includes a spring element.

* * * * *